(12) United States Patent
Bona et al.

(10) Patent No.: US 9,987,905 B2
(45) Date of Patent: Jun. 5, 2018

(54) METHOD OF TORQUE PREDICTION FOR AUTOMOTIVE AIR CONDITIONING COMPRESSOR

(71) Applicant: MAHLE International GmbH, Stuttgart (DE)

(72) Inventors: Joseph M. Bona, Williamsville, NY (US); Matthew R. Warren, Buffalo, NY (US); Ernesto J. Gutierrez, Amherst, NY (US)

(73) Assignee: MAHLE International GmbH, Stuttgart (DE)

( * ) Notice: Subject to any disclaimer, the term of this patent is extended or adjusted under 35 U.S.C. 154(b) by 583 days.

(21) Appl. No.: 14/134,020

(22) Filed: Dec. 19, 2013

(65) Prior Publication Data

US 2014/0180607 A1 Jun. 26, 2014

Related U.S. Application Data

(60) Provisional application No. 61/740,666, filed on Dec. 21, 2012.

(51) Int. Cl.
*B60H 1/32* (2006.01)

(52) U.S. Cl.
CPC ... *B60H 1/3208* (2013.01); *B60H 2001/3238* (2013.01); *B60H 2001/3273* (2013.01); *F02D 2200/101* (2013.01)

(58) Field of Classification Search
CPC ......... G01L 3/00; G01R 19/00; B60H 1/3208; B60H 1/3216; B60H 2001/3238; B60H 2001/3273; F02D 2200/101; F02D 41/1497; F02D 41/083
See application file for complete search history.

(56) References Cited

U.S. PATENT DOCUMENTS

| 5,577,474 A | * | 11/1996 | Livshiz | F02D 31/002 123/352 |
| 5,666,917 A | | 9/1997 | Fraser et al. | |
| 5,924,296 A | * | 7/1999 | Takano | B60H 1/3208 123/339.17 |
| 6,463,749 B2 | * | 10/2002 | Niimi | B60H 1/3208 62/228.1 |

(Continued)

FOREIGN PATENT DOCUMENTS

EP 1698498 A1 9/2006

*Primary Examiner* — Jennifer Simmons
*Assistant Examiner* — Leo T Hinze
(74) *Attorney, Agent, or Firm* — Brinks Gilson & Lione (57) ABSTRACT

The torque of a vehicular air-conditioning compressor is predicted by the steps of starting a vehicle air-conditioning system having an engine and engine control module for controlling multiple vehicle functions, calculating a steady state torque value using an rpm value from the engine, calculating an engine RPM transient torque value using the rpm value from the engine, calculating a electronic control valve current transient torque value using a current value applied to an electronic control valve, selecting a final torque value from a group consisting of the steady state torque value, the engine RPM transient torque value, and the electronic control valve transient torque value, and providing a final torque value to the vehicle engine control module to control a predetermined vehicle function.

4 Claims, 10 Drawing Sheets

(56) References Cited

U.S. PATENT DOCUMENTS

| | | | | |
|---|---|---|---|---|
| 8,434,315 B2* | 5/2013 | Sawada | ............... | B60H 1/3208 374/141 |
| 2001/0008131 A1* | 7/2001 | Ota | ................... | B60H 1/3208 123/339.17 |
| 2004/0211204 A1* | 10/2004 | Matsubara | ........... | B60H 1/3216 62/228.1 |
| 2006/0073047 A1* | 4/2006 | Ohya | ................... | F04B 49/065 417/442 |
| 2006/0204368 A1* | 9/2006 | Imai | ................... | B60H 1/3216 417/212 |
| 2007/0237648 A1* | 10/2007 | Ooya | ................. | B60H 1/3216 417/19 |
| 2007/0253839 A1* | 11/2007 | Higashihara | ......... | B60H 1/3216 417/317 |
| 2008/0292470 A1 | 11/2008 | Sawada et al. | | |
| 2010/0236265 A1* | 9/2010 | Higuchi | ............. | B60H 1/3216 62/228.4 |
| 2012/0125041 A1* | 5/2012 | Ishizeki | ............... | B60H 1/3216 62/509 |

* cited by examiner

DEFINITIONS AND ASSOCIATED INSTURMENTATION

TERMS $T_F$ = FINAL TORQUE
$T_{SS}$ = STEADY STATE TORQUE
$T_{ERPMT}$ = ENGINE RPM TRANSIENT TORQUE
$T_{TT}$ = ELECTRONIC CONTROL VALVE TRANSIENT TORQUE
$T_{MAX}$ = MAXIMUM CALCULATED STEADY STATE TORQUE
$T_{MIN}$ = MINIMUM CALCULATED STEADY STATE TORQUE
$T_{BASE}$ = BASE CALCULATED STEADY STATE TORQUE
ECM = ENGINE CONTROL MODULE
$\Delta I$ = RATE OF CONTROL VALVE CURRENT CHANGE
$\Delta ERPM$ = RATE OF ENGINE RPM CHANGE
$\Delta PD$ = RATE OF DISCHARGE PRESSURE CHANGE
$t_j$ = PRESENT TIME INTERVAL

CALIBRATED PARAMETERS $A_i$ = FAMILY OF CONSTANTS FOR $T_{base}$
$C_i$ = FAMILY OF CONSTANTS FOR $T_{min}$
$D_i$ = FAMILY OF CONSTANTS FOR $T_{max}$
$F_i$ = FAMILY OF CONSTANTS FOR $T_{TT}$
$\Delta I_{lim}$ = MAXIMUM THRESHOLD RATE OF CHANGE OF ECV CURRENT
$\Delta PD_{limh}$ = MAXIMUM THRESHOLD RATE OF DISCHARGE PRESSURE
$\Delta PD_{liml}$ = MINIMUM THRESHOLD RATE ERPM
$\Delta ERPM_{liml}$ = MAXIMUM THRESHOLD RATE OF ERPM
$t_{lim}$ = TIMER VALUE FOR $T_{ERPMT}$ CALCULATION

SENSOR INPUTS

ERPM = ENGINE RPM, FROM ECM (SPEED SENSOR OR CALCULATION BASED ON VEHICLE SPEED)
Pd = DISCHARGE PRESSURE, FROM PRESSURE TRANSDUCER
V = EVAPORATOR BLOWER FAN VOLTAGE, FROM VOLTAGE MEASUREMENT
Ta = AMBIENT TEMPERATURE, FROM THERMISTER
Te = EVAPORATOR AIR OUTLET TEMPERATURE, FROM THERMISTER
I = ELECTRONIC CONTROL VALVE CURRENT, FROM MEASUREMENT OF CURRENT APPLIED TO ECV

FIG. 11

TABLE 1: COEFFICIENTS FOR BASE EQUATION

| ERPM | CRPM | A0 | A1 | A2 | A3 | A4 |
|---|---|---|---|---|---|---|
| 428-786 | 600-1100 | 3.5 | 1.35 | 0.4 | 0.1 | 0.6 |
| 786-1429 | 1100-2000 | 1.75 | 2.1 | 0.4 | 0.1 | 0.6 |
| 1429-2500 | 2000-3500 | 1.25 | 1.9 | 0.4 | 0.1 | 0.6 |
| 2500-3214 | 3500-4500 | 2 | 1.6 | 0.4 | 0.1 | 0.6 |
| 3214-3929 | 4500-5500 | 2 | 1.6 | 0.4 | 0.1 | 0.6 |
| 3929-4643 | 5500-6500 | 2 | 1.6 | 0.4 | 0.1 | 0.6 |
| 4643-5357 | 6500-7500 | 2 | 1.6 | 0.4 | 0.1 | 0.6 |
| 5357-MAX | 7500-MAX | 2 | 1.6 | 0.4 | 0.1 | 0.6 |

FIG. 12

TABLE 1: COEFFICIENTS FOR BASE EQUATION

| ERPM | CRPM | C0 | C1 | D0 | D1 | MAX ICEV WOD | MIN ICEV WOD |
|---|---|---|---|---|---|---|---|
| 428-786 | 600-1100 | 0.0735 | 2.0E-05 | 3.85 | 0.0053 | 0.7 | 0.1 |
| 786-1429 | 1100-2000 | 0.0735 | 2.0E-05 | 0 | 0.0075 | 0.7 | 0.1 |
| 1429-2500 | 2000-3500 | 0.0735 | 2.0E-05 | 2 | 0.0050 | 0.7 | 0.1 |
| 2500-3214 | 3500-4500 | 0.0735 | 2.0E-05 | 4 | 0.0040 | 0.7 | 0.1 |
| 3214-3929 | 4500-5500 | 0.0735 | 2.0E-05 | 2.75 | 0.0040 | 0.7 | 0.1 |
| 3929-4643 | 5500-6500 | 0.0735 | 2.0E-05 | 2.75 | 0.0030 | 0.68 | 0.1 |
| 4643-5357 | 6500-7500 | 0.0735 | 2.0E-05 | 2.75 | 0.0030 | 0.63 | 0.1 |
| 5357-MAX | 7500-MAX | 0.0735 | 2.0E-05 | 2.75 | 0.0030 | 0.48 | 0.1 |

FIG. 13

METHOD OF TORQUE PREDICTION FOR AUTOMOTIVE AIR CONDITIONING COMPRESSOR

RELATED APPLICATIONS

The present application is related and claims priority to application U.S. Ser. No. 61/740,666 filed 21 Dec. 2012 to Joseph M. Bona et al., entitled Method of Torque Prediction for Automotive Air Conditioning Compressor.

TECHNICAL FIELD OF INVENTION

The present invention relates to a method of predicting torque for an automotive air conditioning compressor.

BACKGROUND OF INVENTION

Today's automobiles have increasingly stringent government-mandated fuel consumption and exhaust emission standards. Manufacturers are utilizing more powerful engine controllers and control algorithms to optimize the engine combustion process. In order to precisely meter fuel-to-air ratio, control idle speed, and provide good vehicle acceleration, a good estimate of engine load is needed.

A belt-driven automotive air conditioning compressor, which utilizes power originating from the vehicle engine to cool a vehicle's interior compartment, is a significant load requiring an accurate estimation.

Compressor power is a function of compressor speed and torque. While compressor speed can be easily derived from measured engine speed with a known constant pulley ratio, compressor torque cannot be measured cost-effectively in a production vehicle and thus requires estimation by an algorithm in the Engine Controller.

Historically, adjustments in vehicle engine performance are made by the vehicle engine controller from a calculation of compressor torque or compressor power. One typical method of implementing the load calculation is to use an equation or look up table which is a function of compressor speed and discharge pressure. This equation is appropriate for steady-state operation of a fixed-displacement compressor or for steady-state operation of a variable-displacement compressor at ambient conditions requiring full capacity.

A typical torque equation has limitations predicting torque during transient conditions or when the variable compressor is at partial capacity. The typical equation sometimes over predicts the compressor torque during transients and at partial capacity which results in decreased fuel consumption.

Power estimation equations for fixed and variable displacement compressors are known in the art. Equation 1 below is appropriate for steady state conditions and full capacity although the steady state accuracy may be improved. Another known method utilizes a torque prediction look-up table as a function of discharge pressure and valve current. Again, the look-up table is appropriate for steady state and full capacity conditions. Steady-state accuracy is improved, but there is still a need for greater steady-state accuracy.

$$\text{Power} = A + B*\text{Pressure} + C*\text{Pressure}^2 + D*\text{Pressure}^3 - E*\text{CRPM} + F*\text{Pressure}*\text{CRPM}, \quad \text{Equation 1}$$

where
Pressure is in Bar Gage
Power is in Watts
CRPM is compressor revolutions per minute The applicable range of this equation is from 100 to 6100 Watts.

For compressor 1: A=10
B=88
C=−17.375
D=0.921875
E=0.37390136
F=0.07336425

For compressor 2: A=0
B=46.9
C=0
D=0
E=0.4881
F=0.1056

U.S. Patent Application Publication US 2010/0236265 A1 published 23 Sep. 2010 to Higuchi et al. entitled Air Conditioner for Vehicle, describes a torque estimation strategy with a set of inputs materially different from the present invention. U.S. Publication US 2010/0236265 A1 and its related foreign counterparts are hereby incorporated herein by reference.

As described by U.S. Publication US 2010/0236265 A1, an air conditioner for a vehicle comprises a refrigeration cycle including a variable displacement compressor for refrigerant which uses an engine as a drive source, a condenser, an evaporator, a displacement adjuster means for outputting an adjustment control signal to the compressor, and a compressor torque calculation means for calculating the torque of the compressor. The compressor torque calculation means includes at least two torque estimation means of a saturation region torque estimation means corresponding to a case where the compressor is driven at a maximum discharge displacement and a displacement control region torque estimation means corresponding to a case where it is driven at a discharge displacement other than the maximum discharge displacement, and also includes a correction means for correcting the calculation of the torque of the compressor when a change in engine rotational speed greater than a set value is detected. Purportedly, even when the engine rotational speed changes rapidly, the torque of the compressor in the refrigeration cycle can be calculated.

The methodology described in U.S. Publication US 2010/0236265 A1 is based on a torque calculation utilizing the following inputs:
Displacement control signal
Outside air temperature
Compressor rotational speed
Vehicle running speed
Condenser fan voltage
High side refrigerant pressure
Blower voltage The methodology described in U.S. Publication US 2010/0236265 A1 is highly theoretical and fails to adequately instruct an expert in the art how to practice the invention.

SUMMARY OF THE INVENTION

These and other features and advantages of this invention will become apparent upon reading the following specification, which, along with the drawings, describes a preferred embodiment of the invention in detail.

BRIEF DESCRIPTION OF THE DRAWINGS

Although the drawings represent a single embodiment of the present invention, the drawings are not necessarily to scale and certain features may be exaggerated in order to better illustrate and explain the present invention. The exemplification set forth herein illustrates an embodiment of the invention, in one form, and such exemplifications are not to be construed as limiting the scope of the invention in any manner.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DETAILED DESCRIPTION OF INVENTION

Figure 1:
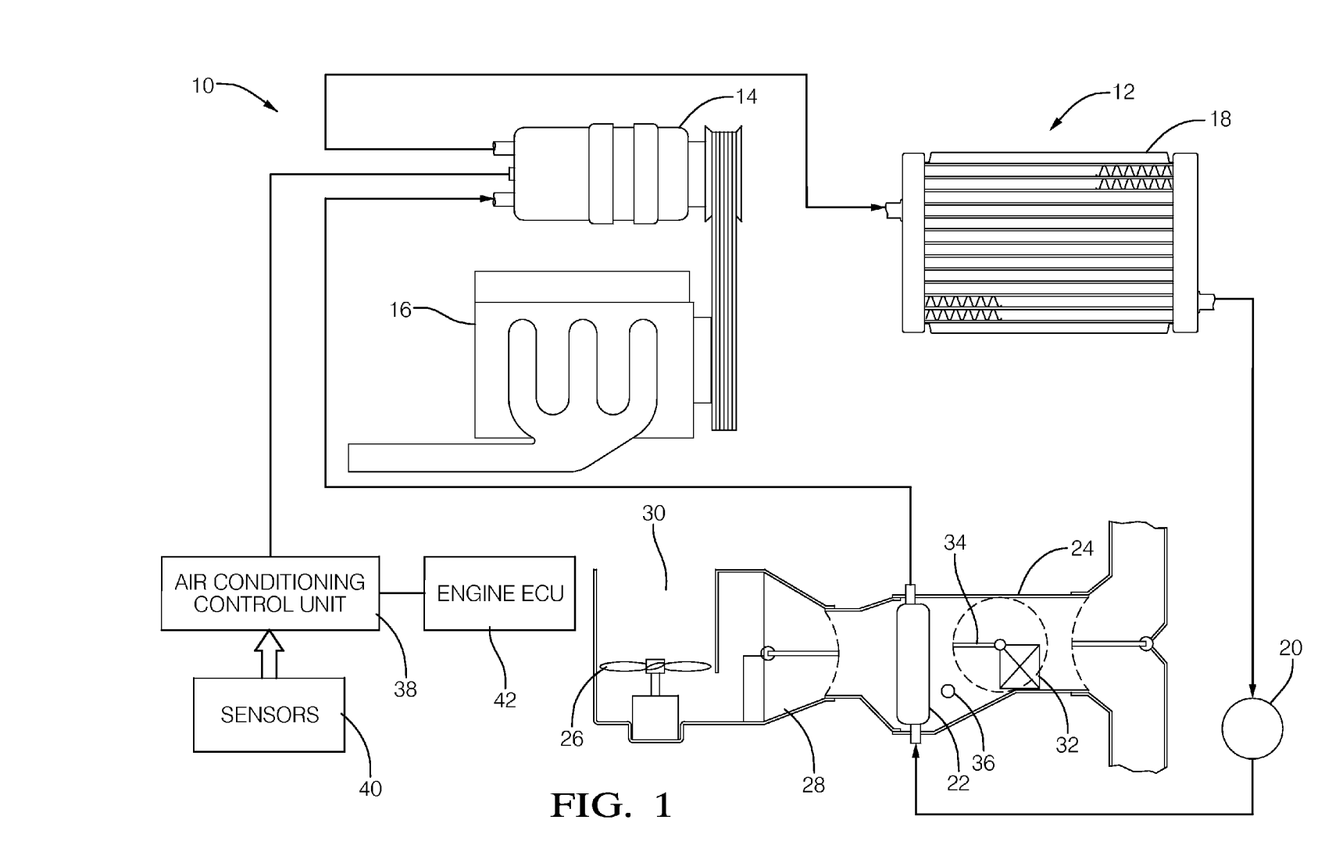
FIG. 1, is a schematic diagram of an air conditioning system configured for automotive application embodying the present invention.

Referring to FIG. 1, the present invention is preferably implemented or practiced in controlling an air conditioning system 10 installed within a ground vehicle such as an automobile 12. The prime mover of the air conditioning system 10 is a compressor 14 which is mechanically driven via a belt drive and an electromagnetic clutch (not illustrated) by a motor/engine 16 of the automobile 12. The compressor 14 compresses hot refrigerant vapor and pumps it to a condenser 18 where it is condensed ultimately to a liquid form. The still pressurized liquid refrigerant from condenser 18 is forced through an expansion valve 20, after which, in its expanded, cooled state it enters an evaporator 22 disposed within an airflow passage formed by a ventilation module 24 within an automobile passenger space. The heated refrigerant vapor continues on to re-enter compressor 14 to renew the cycle.

The low-pressure refrigerant flowing through the evaporator 22 exchanges heat with air flowing through ventilation module 24, which is influenced by a blower 26. Blower 26 is disposed in an air duct 28 through which air for air conditioning passes, and air drawn from an air suction port for air conditioning 30 is directed to evaporator 22 by the blower 26. A portion of the air having passed through the evaporator 22 is directed to a heater unit 32 disposed at a downstream position, and the rate between the amount of air to be passed through the heater unit and the amount of air to be bypassed is adjusted by an air mixing damper 34. In this embodiment, an air temperature sensor 36 at the evaporator 22 exit is provided at the exit side of the evaporator 22 for detecting the temperature of the air after passing through the evaporator 22, and the detected signal is inputted into an air conditioning control unit 38 performing the air conditioning. Signals from various other system sensors 40 are also inputted into the air conditioning control unit 38. An engine control unit 42 (ECU) associated with engine 16 is also electrically interfaced with the air conditioning control unit 38. Both the air conditioning control unit 38 and the ECU 42 contain control circuitry, such as a microprocessor, and volatile and/or non-volatile memory operable to practice the torque prediction method described herein below as well as to affect control of the overall air condition system 10, such as by outputting a displacement control signal to the compressor 14.

An embodiment of the invention is an apparatus and methodology used to calculate or predict the torque of an automotive air conditioner in real time for steady state and transient conditions. This methodology was derived to utilize data acquired from sensors readily available on a standard production vehicle. Thus, no additional expense or costs would be incurred to implement this technique. The torque is predicted utilizing the following inputs:

Control valve current
Outside air temperature
Evaporator air outlet temperature
Engine speed
High side pressure
Evaporator blower voltage $$\text{Torque, estimated} = B1*Vb*Teao*(Toa-Teao)*((Pd/Ps)\hat{}K1-1)/CRPM,$$

where:
CRPM=Compressor RPM
B1=Correlation Constant
Vb=Blower Voltage
Teao=Evaporator Air Out Temperature
Toa=Outside Air Temperature
Pd=High Side Pressure
Ps=Saturation Pressure of Refrigerant at Teao (estimated suction pressure)
K1=(k−1)/k
k=specific heat ratio for the superheated refrigerant.

An improved relationship, is: Torque, correlated=2.7*SQRT(Torque, estimated)

This relationship is acceptable to estimate torque at a quasi-steady condition, but may not predict change in torque when, for example, ECV current is changing.

Base Equation

A base equation was derived from the above relationship based on empirical observations and inclusion of an ECV current parameter. Additional equations were derived empirically and are used for unique conditions to improve the accuracy of the calculation for these unique conditions.

The base equation is:
▶ Compressor Torque is calculated as:

$$\text{Torque} = A0 + A1*P*(V)^{A2}*\Delta T*((P/T)^{A3}-1)*(I)^{A4}/\text{Rpm}$$

Figure 2:
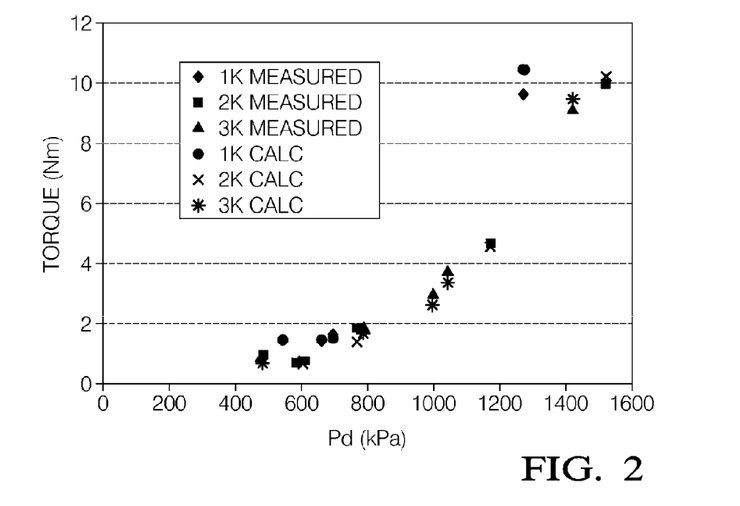
FIG. 2, is a graphical depiction of empirical bench test data and calculated compressor torque data of the air conditioning system of FIG. 1 under steady-state conditions wherein accuracy is ±2 Nm or less.
Figure 3:
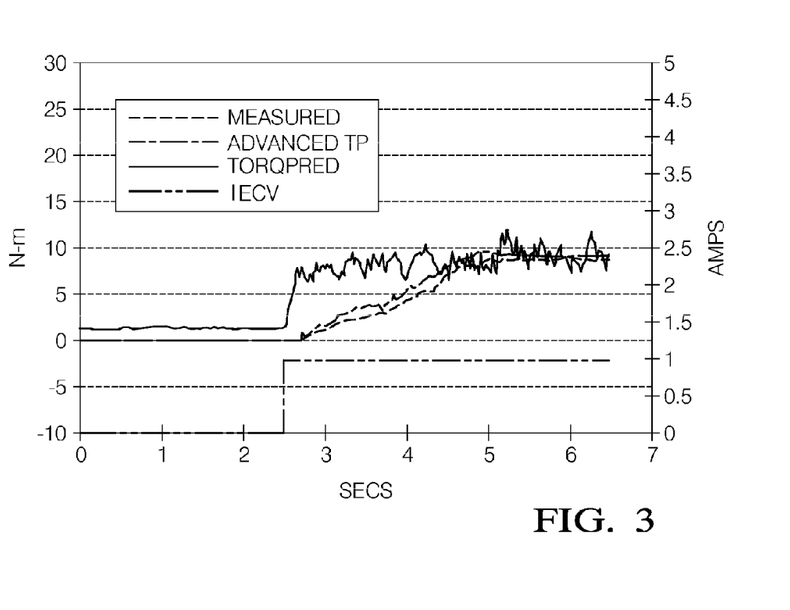
FIG. 3, is a graphical depiction of empirical bench test data illustrating transient compressor torque when the electronic control valve (ECV) is transitioned from "off" to "on"
Figure 4:
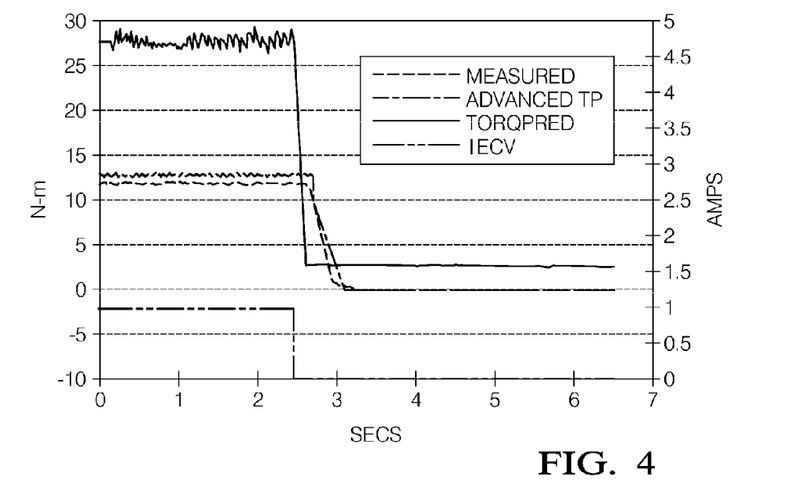
FIG. 4, is a graphical depiction of empirical bench test data illustrating transient compressor torque when the electronic control valve (ECV) is transitioned from "on" to "off"
Figure 5:
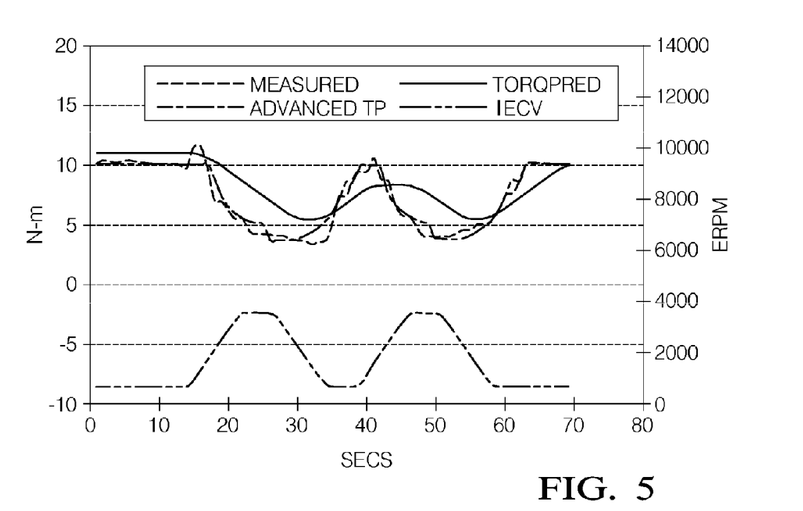
FIG. 5, is a graphical depiction of empirical bench test data illustrating transient compressor torque during acceleration and de-acceleration.

Where:
P=High Side Pressure
V=Evaporator Blower Voltage
ΔT=Evaporator Air Temperature Differential
T=Evaporator Air Outlet Temperature
I=Control Valve Current
Rpm=Engine Speed
A0=Torque Offset Constant
A1=Torque Scaling Constant
A2=Evaporator Scaling Constant
A3=Pressure Temperature Scaling Constant
A4=Current Scaling Constant Steady state bench test results for this equation are shown in FIG. 2.

For the steady state conditions tested, the accuracy is ±2 Nm or less.

Additional steady state accuracy can be achieved by establishing a set of constants for the based equation for a given rpm range. An example is shown below.

Figure 12:
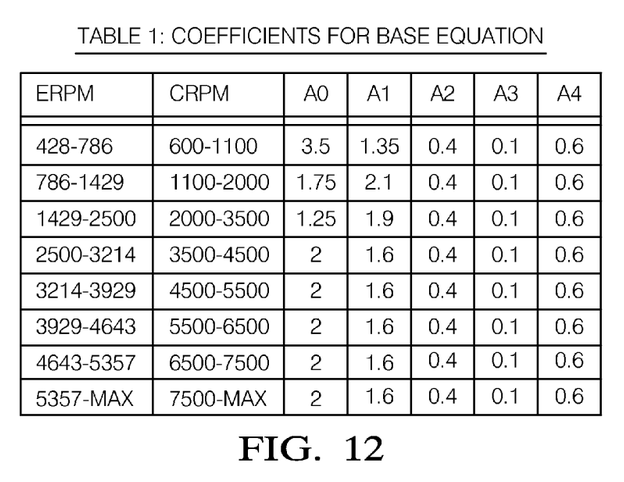
FIG. 12, is Table 1: Coefficients for Base Equation.

The coefficient values used for a 6CVCc on a T3000 system are shown in Table 1, depicted in FIG. 12.

Advanced Torque Prediction Method

Transient bench test results are shown in FIGS. 2-5. As shown in the transient plots, the predictive accuracy of the base equation, shown as TP, is not equivalent to the steady state results. Additional equations were empirically derived for transient events as well as when Iecv (electronic control valve current) is below a calibratable threshold or the compressor is at full stroke. The results for the additional equations are shown on the transient plots as Adv TP. As shown on the transient plots, the predictive accuracy is greatly improved by utilizing the additional equations.

Transient Conditions

Both compressor rpm and ECV current can change rapidly enough to adversely affect the predicted torque during the transient event. To improve prediction accuracy it is possible to make note of a change in compressor rpm or ECV current and to mathematically compensate for the transient.

RPM

In the event of a rapid change in compressor RPM, the following strategy is utilized:
Detect an RPM change above a predetermined threshold, called the trigger limit.
Calculate torque with the base equation and maintain this value for three seconds.
After 3 seconds, restart torque calculation using the Table 1 coefficients from the initial
RPM conditions and the P, T, ΔT, V, Iecv, and RPM values stored in computer memory for 3 seconds (i.e. P, T, ΔT, V, Iecv, and RPM are updated every second, but are 3 seconds old.)
Verify that RPM variation has stabilized below the trigger limit.
Change to the coefficients for the new RPM and remove the 3 second calculation delay.

The trigger limit for RPM change is calibratable and dependent on compressor and system type.

Iecv

In the event of a rapid change in Iecv, calculate torque based on a linear relationship of Pd with an offset and return to the base equation when Pd stabilizes.

Example

6CVCc on T3000 system. Iecv starts at 0 A and step changes to 1.0 A.

$$\text{Torque} = 0.045 Pd - 36 \text{ until } Pd2 - Pd1 < 5$$

Predictive accuracy was also improved by adding equations to establish a minimum and maximum compressor torque value for a given set of conditions. The following equations were established to achieve this objective:

$$\text{Minimum Torque} = C0 + C1*E \text{ rpm}$$

$$\text{Maximum Torque} = D0 + D1*Pd$$

Where:
C0=min torque offset coefficient. Is calibratable based on compressor, system and RPM.
C1=min torque coefficient. Is calibratable based on compressor, system and RPM.
D0=max torque offset coefficient. Is calibratable based on compressor, system and RPM.
D1=max torque coefficient. Is calibratable based on compressor, system and RPM.

The minimum torque equation is used when Iecv is less than min Iecv, a calibratable term.

The maximum torque equation is used when Iecv is greater than max Iecv, a calibratable term, or the predicted torque is greater than the maximum calculated torque.

Figure 13:
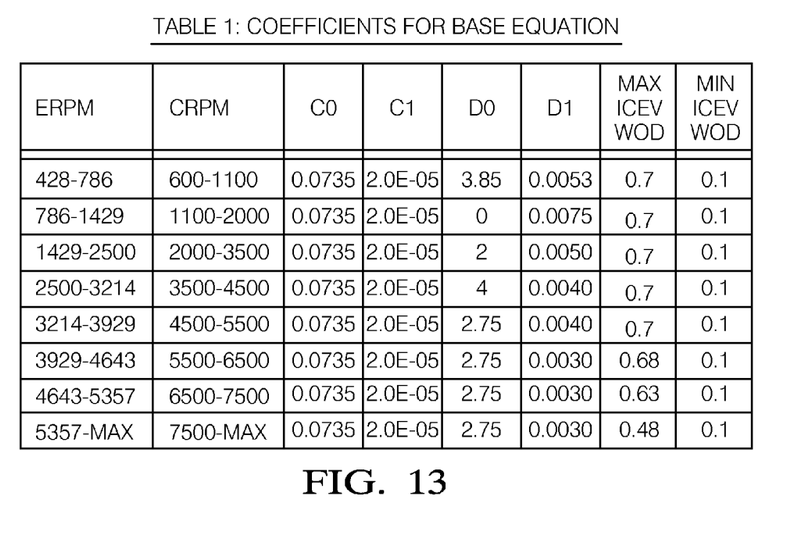
FIG. 13, is Table 2: Coefficients for Maximum and Minimum Torque Equations.

The coefficient values, min Iecv and max Iecv used for a 6CVCc on a T3000 system are shown in Table 2 depicted in FIG. 13.

This predictive system is intended for real time vehicle use and as such is dependent on the communication speed or frequency of information update between the HVAC module and the ECM.

Note that the calibratable values shown in the preceding are for a specific compressor type on a specific AC system. A different combination of compressor type and AC system may require different calibratable values. It is expected that such values would be unchanged for a given compressor type and AC system combination. That is to say, once the calibratable values are established for a type of compressor on a vehicle AC system, they would be applicable for the entire production run of that compressor/system combination.

Figure 6:
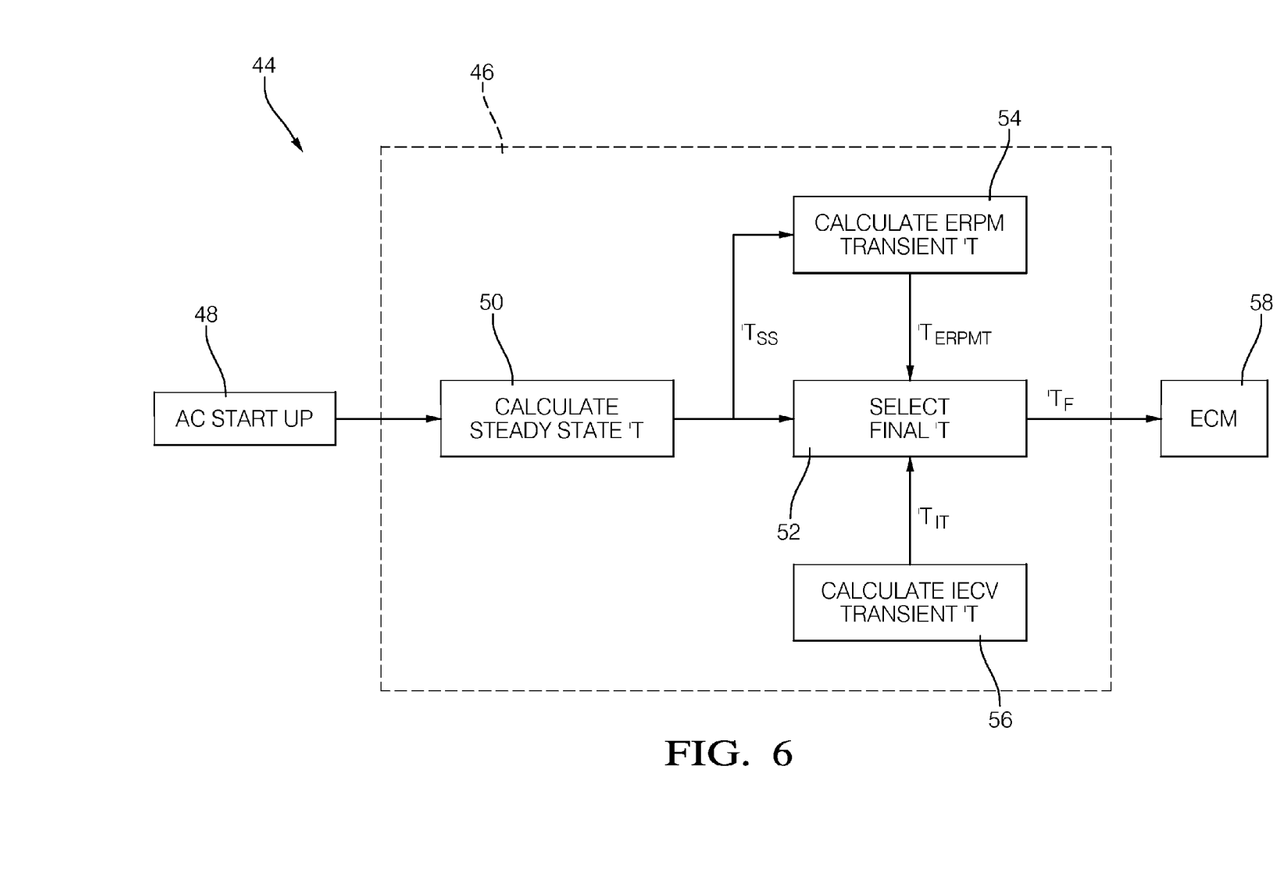
FIG. 6, is a master flow diagram for the compressor torque prediction system embodied in the present invention.

Referring to FIG. 6, a master flow diagram 44 for the compressor torque prediction system embodied in the present invention is illustrated wherein a calculation logic block 46 is initialized by an AC start-up step 48, and which, in turn provides a final torque $T_f$ output logic signal to an engine control module (ECM) 58. AC start-up step 48 feeds a logic step 50 for calculating steady state torque ($T_{SS}$) which, in turn, feeds a first input of a logic step 52 wherein final torque ($T_f$) is selected. Logic step 50 also feeds a $T_{SS}$ signal to a logic step 54 which calculates engine revolutions per minute (ERPM) transient torque, which feeds an engine RPM from a host vehicle engine control module (speed sensor or a calculation based upon vehicle speed) to a second input of logic step 52 as $T_{erpmt}$. Finally, logic step 56 calculates IECV transient torque, feeding an electronic control valve transient torque signal ($T_{it}$) to a third input of logic step 52.

Figure 7:
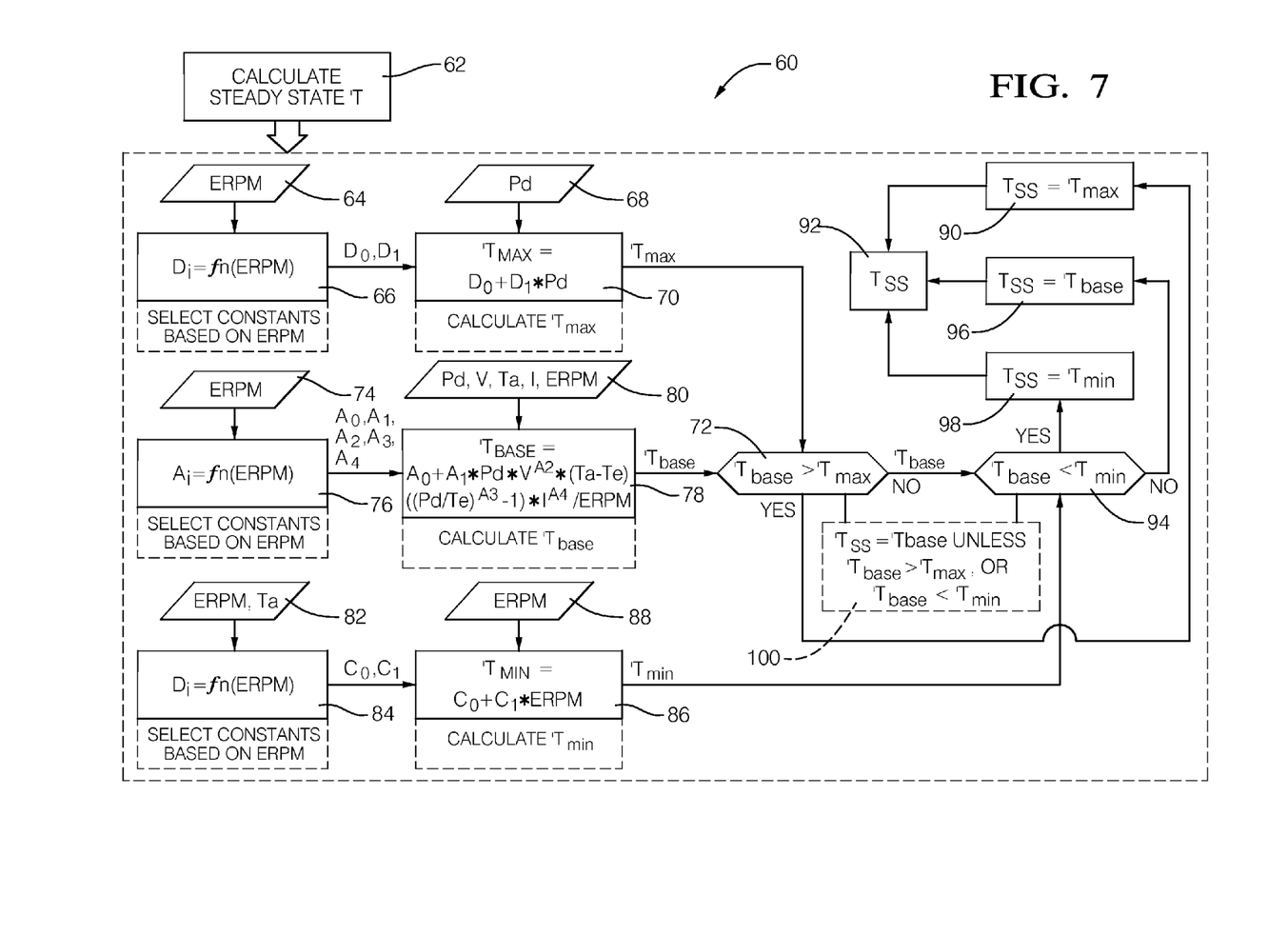
FIG. 7, is a flow diagram for calculating steady state compressor torque in practicing the present invention.

Referring to FIG. 7, a flow diagram 60 for calculating steady state compressor torque in practicing the present invention expands on a step 62 of calculating steady state torque T corresponding with step 50 of FIG. 6. An engine speed (ERPM) transducer 64 feeds an input to a logic block 66, which operates to select constants based on ERPM, and outputs selected constants $D_0$ and $D_1$ to a first input of a following logic block 70. A discharge pressure signal (Pd) from discharge pressure transducer 68 feeds a second input of logic block 70. Logic block 70 operates to calculate maximum steady state torque ($T_{max}$). Logic block 70 outputs a $T_{max}$ signal to a first input of a yes/no logic block 72.

An ERPM transducer 74 feeds an input to a logic block 76, which operates to select constants based on ERPM, and outputs selected constants $A_0$, $A_1$, $A_2$, $A_3$ and $A_4$ to a first input of a following logic block 78. A discharge pressure signal (Pd), an evaporator blower fan voltage signal (V), a thermister ambient temperature signal (Ta), an electronic control valve current signal from measurement of current applied to ECV (I) and a ERPM signal, from transducers collectively illustrated as 80, provide a second input to logic block 78, which are also employed in calculating a base steady state torque torque ($T_{base}$) output from logic block 78 which is fed to a second input of yes/no logic block 72.

An ERPM transducer signal and a thermistor ambient temperature (Ta) signal from transducers collectively illustrated as 82 feed a logic block 84 which operates to select constants based on ERPM, and output selected constants $C_0$ and $C_1$ to a first input of a following logic block 86. A EPRM transducer 88 feeds a signal to a second input of logic block 86, which are employed in calculating a minimum calculated steady state torque ($T_{min}$) as an output from logic block 86.

If $T_{base} > T_{max}$, a first output of yes/no logic block 72 feeds a logic block 90 which equates $T_{SS}$ with $T_{max}$, and, in turn, feeds a $T_{SS}$ output logic block 92. If $T_{base} \leq T_{max}$, a second output of yes/no logic block 72 feeds a second yes/no logic block 94. The $T_{min}$ output of logic block 86 feeds a second input of yes/no logic block 94. Yes/no logic blocks 72 and 94 are logically joined by common logic as set forth in phantom logic block 100. If $T_{base} < T_{min}$, a first output of yes/no logic block 94 feeds a logic block 98 which equates $T_{SS}$ with $T_{max}$, and, in turn, feeds $T_{SS}$ output logic block 92. If $T_{base} \geq T_{min}$, a second output of yes/no logic block 94 feeds a logic block 96 which equates $T_{SS}$ with $T_{base}$ and, in turn, feeds $T_{SS}$ output block 92.

Figure 8:
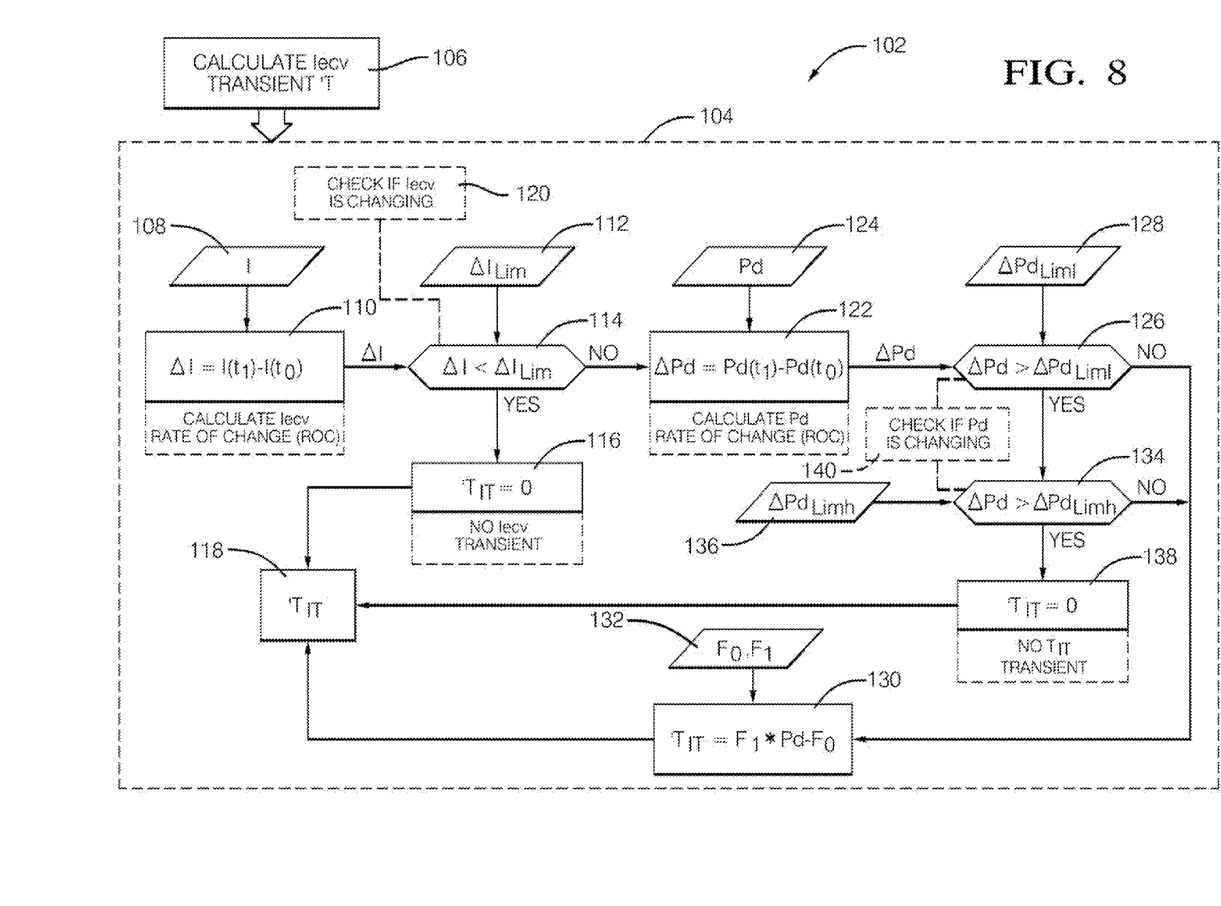
FIG. 8, is a flow diagram for calculating electronic control valve current (Ievc) transient torque in practicing the present invention.

Referring to FIG. 8, a flow diagram 102 including a calculation logic block 104 for calculating electronic control valve current (Ievc) transient torque in practicing the present invention expands on a step 106 of calculating Ievc corresponding with step 56 of FIG. 6. An electronic control valve current (from measurement of current applied to ECV) transducer (I) 108 feeds an input to a logic block 110 which operates to calculate Iecv rate of change (ROC), and outputs a rate of control valve current change ($\Delta I$) to an input of a yes/no logic block 114. A maximum threshold rate of change of ECV current sensor ($\Delta I_{Lim}$) 112 feeds a second input to yes/no logic block 114. Logic block further functions, at logic block 120 (in phantom) to check if Iecv is changing. If $\Delta I < \Delta I_{Lim}$, a first output to a logic block 116 equates electronic control valve transient torque ($T_{IT}$) to second input of logic block 1300, wherein there is no $I_{evc}$ transient which, in turn, feeds a $T_{IT}$ output logic block 118. If $\Delta I \geq \Delta I_{Lim}$, a second output of yes/o logic block 114 feeds a first input of a following logic block 122. Logic block operates to calculate Pd rate of change (ROC). A Pd pressure transducer 124 feeds a second input of logic block 122, which outputs a rate of discharge pressure change ($\Delta Pd$) to a first input of a yes/no logic block 126. A minimum threshold rate of discharge pressure ($\Delta Pd_{limi}$) transducer 128 feeds a second input of yes/no logic block 126. If $\Delta Pd < \Delta Pd_{Liml}$, a first output of yes/no logic block 126 feeds a first input of another yes/no logic block 134. Yes/no logic block 126 and 134 mutually check if Pd is changing charging. If $\Delta Pd \, \Delta Pd_{Liml}$, a second output of yes/no logic block 126 feeds a first input of a logic block 130. A maximum threshold rate of discharge pressure ($\Delta Pd_{Limh}$) transducer 136 feeds a second input of logic block 134. If $\Delta Pd < \Delta Pd_{Limh}$, a first output of yes/no logic block 134 feeds a logic block 138 which equates electronic control valve transient torque ($T_{IT}$) with zero, i.e. no $T_{IT}$ transient, which, in turn, provides an output to output logic block 118. If $\Delta Pd \, \Delta Pd_{Limh}$, a second output of yes/no logic block 134 feeds the input of logic block 130. A transducer 132 feeds calibratable parameters $F_0$ and $F_1$ to a second input of logic block 130 which, in turn, feeds the output logic block 118. A common logic block 140 (in phantom) checks yes/no logic blocks 126 and 134 to determine if Pd is changing.

Figure 9:
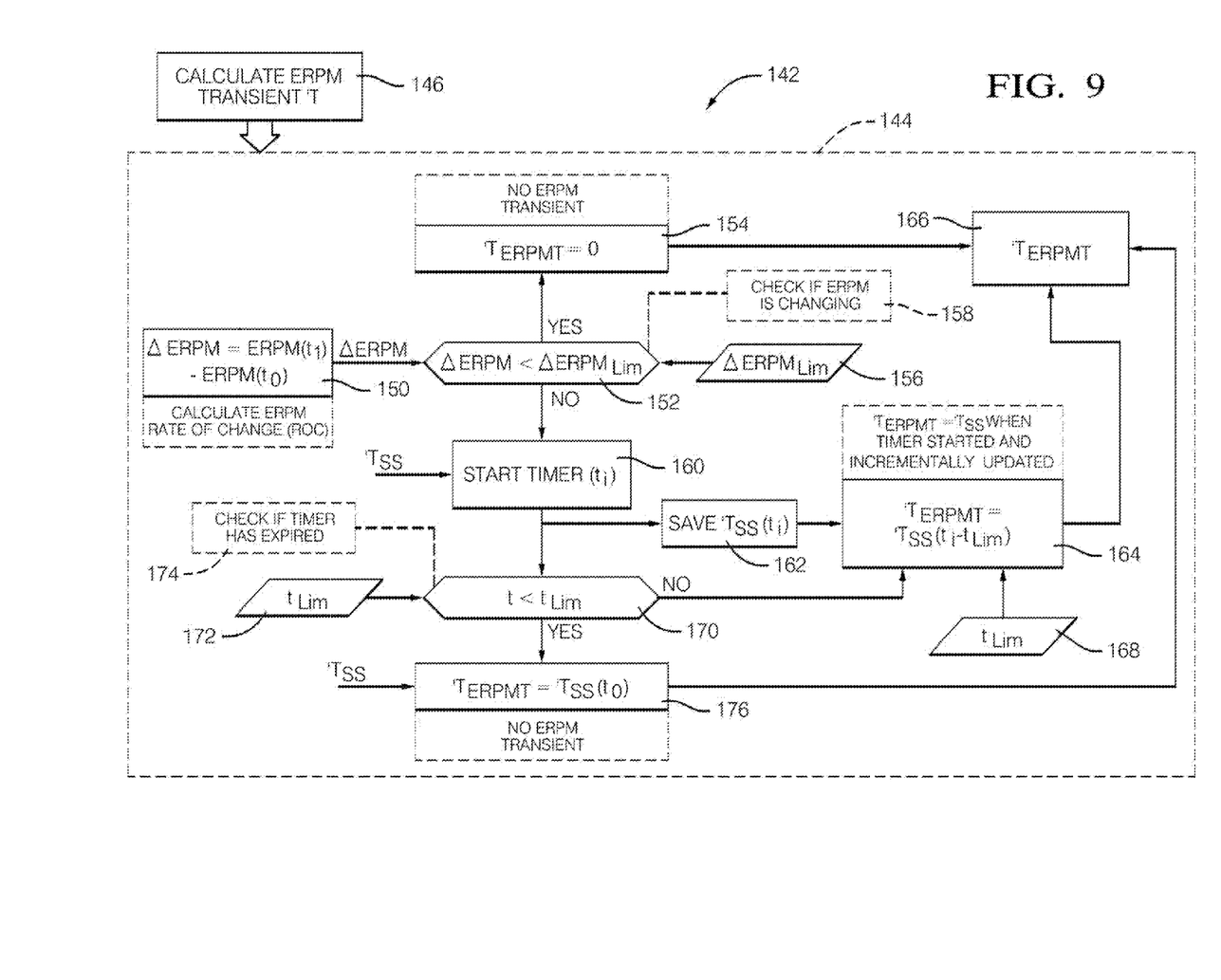
FIG. 9, is a flow diagram for calculating engine revolutions per minute (ERPM) transient torque in practicing the present invention.

Referring to FIG. 9, a flow diagram 142 for calculating engine revolutions per minute (ERPM) transient torque (T) in practicing the present invention expends on a step 146 of calculating ERPM transient torque corresponding with logic step 54 of FIG. 6. A logic block 150 which operates to calculate ERPM rate of change (ROC), and outputs a rate of engine RPM change ($\Delta ERPM$) to an input of a yes/no logic block 152. A maximum threshold rate of ERPM ($\Delta ERPM_{lim}$) transducer 156 feeds a second input to yes/no logic block 152. If $\Delta ERPM < \Delta ERPM_{Lim}$, yes/no logic block 152 feeds a logic block 154 which equates engine RPM transient torque ($T_{ERPMT}$) to zero which, in turn, outputs a feed to an output logic block 166. A phantom logic block 158 coupled to yes/no logic block 152 checks if ERPM is changing. If $\Delta ERPM \geq \Delta ERPM_{Lim}$, yes/no logic block 152 feeds a first input to a present time interval start timer logic block 160, which also receives a $T_{SS}$ second input. Logic block 160 provides an output to a following logic block 162 to save $T_{SS}$ at a present time interval ($t_i$), which, in turn, feeds a first input of a logic block 164 in which $T_{ERPMT} = T_{SS}$ when the timer is started and incrementally updated. The output of logic block 164 feeds the output logic block 166. A timer value for a $T_{ERPMT}$ calculation logic block 168 feeds logic block 164. The output of logic block 160 also feeds a first input of a yes/no logic block 170. A $t_{Lim}$ transducer 172 feeds a second input of the yes/no logic block 170. If $t < t_{Lim}$, yes/no logic block 170 feeds a first input of a no ERPM transient logic block 176 which, in turn, feeds the output logic block 166. A $T_{SS}$ input feeds a second input of logic block 176. Yes/no logic block 170 is controlled by phantom logic block 174 to determine if the timer has expired.

Figure 10:
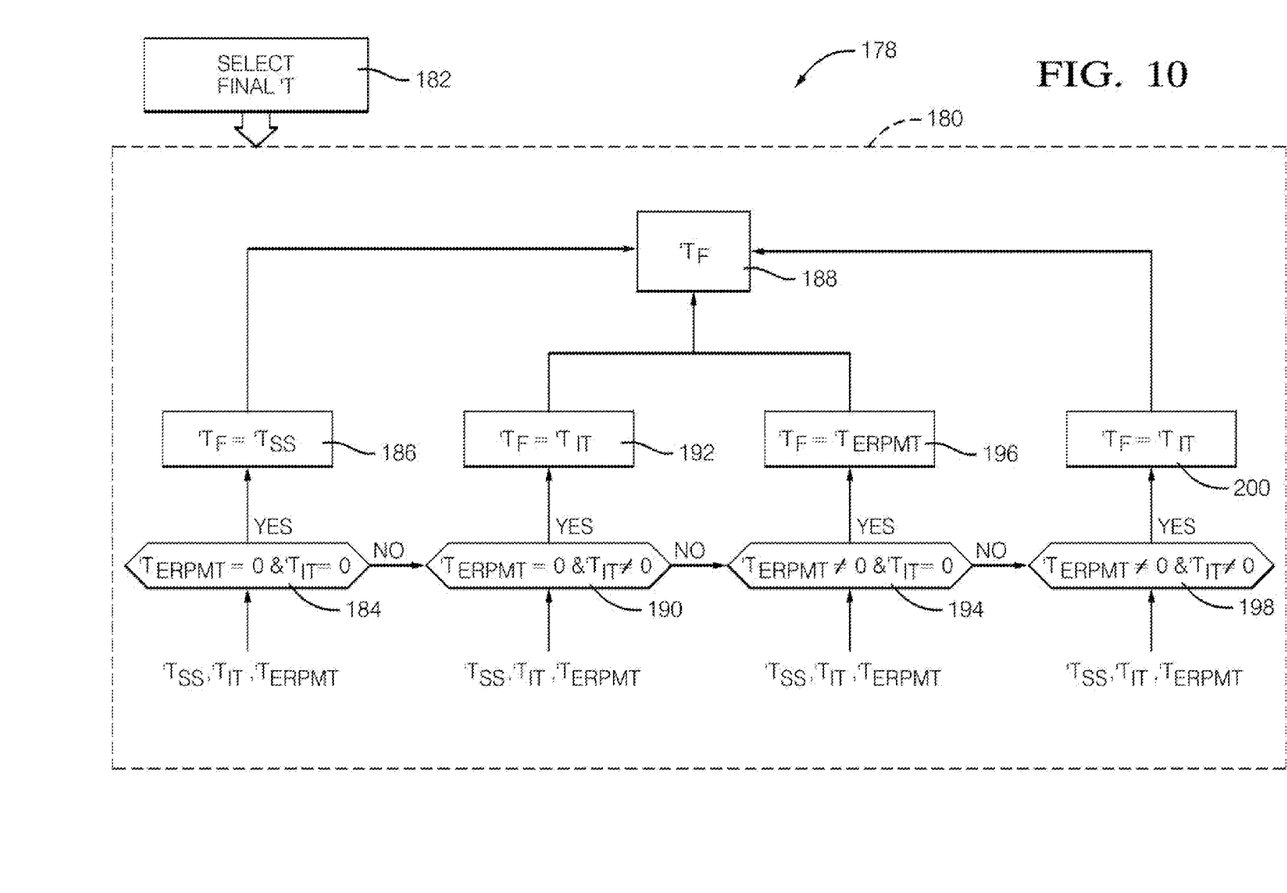
FIG. 10, is a flow diagram for selecting a final torque ($T_F$) value in practicing the present invention.

Referring to FIG. 10, a flow diagram 178 including a calculation block 180 for selecting a final torque ($T_F$) value in practicing the present invention expands on a step 182 of selecting a final torque ($T_F$) corresponding with step 52 of FIG. 6. Separate inputs comprising $T_{SS}$, $T_{IT}$ and $T_{ERPMT}$ are fed into serially coupled yes/no logic blocks 184, 190, 194 and 198. If $T_{ERPMT} = 0$ and $T_{IT} = 0$, yes/no logic block 184 feeds a logic block 186 which equates $T_F$ and $T_{SS}$ which, in turn feeds an output to an output logic block 188. If $T_{ERPMT} \neq 0$ or $T_{IT} \neq 0$, a second output of yes/no logic block 184 feeds second yes/no logic block 190. If $T_{ERPMT} = 0$ and $T_{IT} \neq 0$, yes/no logic block 190 feeds a logic block 192 which equates $T_F$ and $T_{IT}$ which, in turn, feeds an output to output logic block 188. If $T_{ERPMT} \neq 0$ or $T_{IT} = 0$, a second output of yes/no logic block 190 feeds a third yes/no logic block 194. If $T_{ERPMT} \neq 0$ and $T_{IT} = 0$, yes/no logic block 194 feeds a logic block 196 which equates $T_F$ with $T_{ERPM}$ which, in turn, feeds an output to output logic block 196. If $T_{ERPMT} = 0$ or $T_{IT} \neq 0$, a second output of yes/no logic block 194 feeds a fourth yes/no logic block 198. If $T_{ERPMT} \neq 0$ and $I_{IT} \neq 0$, yes/no logic block 198 feeds a logic block 200 which equates $T_F$ and $T_{IT}$ which, in turn, feeds an output to output logic block 188.

Figure 11:
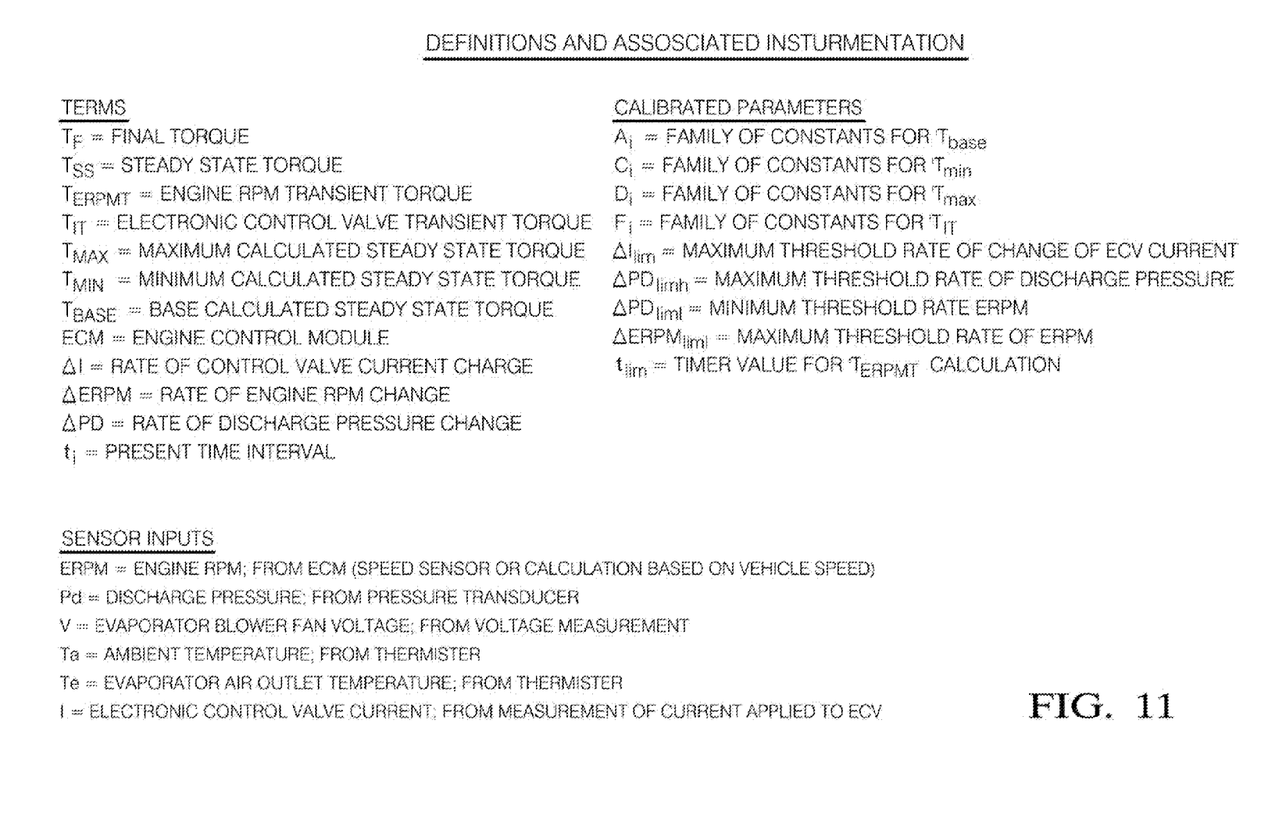
FIG. 11, is a glossary of definitions and associated instrumentation terminology employed in describing and practicing the present invention.

Referring to FIG. 11, a schedule of definitions and associated instrumentation, including definitions of terms, calibration parameters and sensor inputs, is provided to assure a clear understanding of the forgoing description of the invention.

While this invention has been described in terms of the preferred embodiments thereof, it is not intended to be so limited, but rather only to the extent set forth in the claims that follow.

It is to be understood that the invention has been described with reference to a specific embodiment with variations to provide the features and advantages previously described and that the embodiment is susceptible of modification as will be apparent to those skilled in the art.

Furthermore, it is contemplated that many alternative, common inexpensive materials can be employed to construct the basic constituent components. Accordingly, the forgoing is not to be construed in a limiting sense.

The invention has been described in an illustrative manner, and it is to be understood that the terminology, which has been used is intended to be in the nature of words of description rather than limitation.

Obviously, many modifications and variations of the present invention are possible in light of the above teachings. It is, therefore, to be under stood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A method of predicting torque for an automotive air conditioning compressor comprising the steps of:
    starting an air-conditioning system for a vehicle having an engine and ECM for controlling multiple vehicle functions;
    calculating a steady state torque value using an RPM value from the engine;
    calculating an engine RPM transient torque value using the RPM value from the engine;
    calculating a Iecv transient torque value using a current value applied to an electronic control valve;
    selecting a final torque value from a group consisting of said steady state torque value, said engine RPM transient torque value, and said Iecv transient torque value;
    providing said final torque value to the ECM of the vehicle to control a predetermined function of the engine, and
    controlling a vehicle engine by adjusting an engine performance of the vehicle engine based on the final torque value,
    wherein said step of calculating a steady state torque value using an RPM value from the engine comprises the steps of:
    selecting a first set of constants which are employed to calculate a maximum steady state torque value $T_{max}$;
    selecting a second set of constants which are employed to calculate a base steady state torque value $T_{base}$;
    selecting a third set of constants which are employed to calculate a minimum steady state torque value $T_{min}$;
    comparing $T_{base}$ with $T_{max}$ and $T_{base}$;
    equating $T_{max}$ as a steady state torque value $T_{ss}$ if $T_{base} > T_{max}$;
    equating $T_{min}$ as a steady state torque value $T_{ss}$ if $T_{base} \leq T_{max}$ and $T_{base} < T_{min}$; and
    equating $T_{base}$ as a steady state torque value $T_{ss}$ if $T_{base} \leq T_{max}$ and $T_{base} \geq T_{min}$.

2. A method of predicting torque for an automotive air conditioning compressor comprising the steps of:
    starting an air-conditioning system for a vehicle having an engine and ECM for controlling multiple vehicle functions;
    calculating a steady state torque value using an RPM value from the engine;
    calculating an engine RPM transient torque value using the RPM value from the engine;
    calculating a Iecv transient torque value using a current value applied to an electronic control valve;
    selecting a final torque value from a group consisting of said steady state torque value, said engine RPM transient torque value, and said Iecv transient torque value;
    providing said final torque value to the ECM of the vehicle to control a predetermined function of the engine, and
    controlling a vehicle engine by adjusting an engine performance of the vehicle engine based on the final torque value,
    wherein said step of calculating an ERMP transient torque value using the RPM value from the engine comprises the steps of:
    calculating a rate of engine RPM change $\Delta EPRM$;
    calculating a maximum threshold rate of EPRM as $\Delta EPRM_{Lim}$;
    equating engine RPM transient torque value $T_{ERPMT}$ to zero or null if $\Delta EPRM < \Delta EPRM_{Lim}$;
    equating engine RPM transient torque value $T_{ERPMT}$ to $T_{ss}(t_i - t_{Lim})$ if $\Delta EPRM \geq \Delta EPRM_{Lim}$ and $t \geq t_{Lim}$; and
    equating engine RPM transient torque value $T_{ERPMT}$ to $T_{ss}(t_0)$ if $\Delta EPRM \geq \Delta EPRM_{Lim}$ and $t < t_{Lim}$.

3. A method of predicting torque for an automotive air conditioning compressor comprising the steps of:
    starting an air-conditioning system for a vehicle having an engine and ECM for controlling multiple vehicle functions;
    calculating a steady state torque value using an RPM value from the engine;
    calculating an engine RPM transient torque value using the RPM value from the engine;
    calculating a Iecv transient torque value using a current value applied to an electronic control valve;
    selecting a final torque value from a group consisting of said steady state torque value, said engine RPM transient torque value, and said Iecv transient torque value;
    providing said final torque value to the ECM of the vehicle to control a predetermined function of the engine, and
    controlling a vehicle engine by adjusting an engine performance of the vehicle engine based on the final torque value,
    wherein said step of
    calculating a Iecv transient torque value using a current value applied to an electronic control valve comprises the steps of:
    calculating a rate of control valve current change $\Delta I$;
    calculating a maximum threshold rate of change of EVC current $\Delta I_{Lim}$;
    equating electronic control valve transient torque value $T_{IT}$ to zero or null if there is no Iecv transient $\Delta I < \Delta I_{Lim}$;
    equating electronic control valve transient torque value $T_{IT}$ to $F_1 * Pd - F_0$ if $\Delta I \geq \Delta I_{Lim}$ and $\Delta Pd \leq \Delta Pd_{Liml}$; and equating electronic control valve transient torque value $T_{IT}$ to zero or null if $\Delta I \geq \Delta I_{Lim}$ and $\Delta Pd > \Delta Pd_{Liml}$ and $\Delta Pd > \Delta Pd_{Limh}$.

4. The method of predicting torque of claim 3, wherein said step of selecting a final torque value $T_F$ from a group consisting of said steady state torque value $T_{SS}$, said engine RPM transient torque value $T_{ERPMT}$, and said lecv transient torque value $T_{IT}$ comprises the steps of:

equating $T_F$ to $T_{SS}$ when $T_{ERPMT}=0$ and $T_{IT}=0$;
equating $T_F$ to $T_{IT}$ when $T_{ERPMT}=0$ and $T_{IT} \neq 0$;
equating $T_F$ to $T_{ERPMT}$ when $T_{ERPMT} \neq 0$ and $T_{IT}=0$; and
equating $T_F$ to $T_{IT}$ when $T_{ERPMT} \neq 0$ and $T_n \neq 0$.

* * * * *